United States Patent
Yoo

(10) Patent No.: US 10,848,835 B2
(45) Date of Patent: Nov. 24, 2020

(54) VIDEO SUMMARY INFORMATION PLAYBACK DEVICE AND METHOD AND VIDEO SUMMARY INFORMATION PROVIDING SERVER AND METHOD

(71) Applicant: Plain Bagel, Inc., Seoul (KR)

(72) Inventor: Jinjae Yoo, Seoul (KR)

(73) Assignee: Plain Bagel, Inc., Seoul (KR)

( * ) Notice: Subject to any disclaimer, the term of this patent is extended or adjusted under 35 U.S.C. 154(b) by 0 days.

(21) Appl. No.: 15/843,056

(22) Filed: Dec. 15, 2017

(65) Prior Publication Data
US 2019/0158928 A1    May 23, 2019

(30) Foreign Application Priority Data
Nov. 23, 2017   (KR) .......................... 10-2017-0157237

(51) Int. Cl.
*H04N 21/488*    (2011.01)
*H04N 21/235*    (2011.01)
(Continued)

(52) U.S. Cl.
CPC .......... *H04N 21/4884* (2013.01); *G11B 27/02* (2013.01); *H04N 21/2353* (2013.01);
(Continued)

(58) Field of Classification Search
CPC ...... H04N 21/8456; H04N 21/84; H04N 7/24; H04N 21/4825; H04N 5/4403; H04N 5/44543; H04N 21/44008; H04N 21/44029; H04N 21/8549; H04N 2005/4408; H04N 21/47; H04N 21/4821; H04N 21/4826;
(Continued)

(56) References Cited

U.S. PATENT DOCUMENTS

| 8,230,343 B2 * | 7/2012 | Logan .................. G10H 1/0033 715/723 |
| 10,229,717 B1 * | 3/2019 | Davis .................. G11B 27/036 |

(Continued)

FOREIGN PATENT DOCUMENTS

| KR | 200900381213 A | 4/2009 |
| KR | 20140088947 A | 7/2014 |

OTHER PUBLICATIONS

Office Action in KR 10-2017-0157237, dated Nov. 5, 2018.
(Continued)

*Primary Examiner* — Mulugeta Mengesha
*Assistant Examiner* — Alazar Tilahun
(74) *Attorney, Agent, or Firm* — John H. Choi & Associates

(57) ABSTRACT

A video summary information playback device and method are provided. The video summary information playback device includes an input unit configured to receive a video selection signal based on an external input, a video receiver configured to receive a video and subtitle information from a video server, a summary information receiver configured to receive meta information of the video from a video summary information providing server and to selectively receive summary information based on the meta information, and an output unit configured to output a still frame of the video and at least one among the subtitle information and the summary information based on the meta information.

24 Claims, 8 Drawing Sheets

| | Subtitle information | | Summary information | |
|---|---|---|---|---|
| | First index | First subtitle | Second index | Second subtitle |
| 1 | O | O | X | X |
| 2 | O | O | X | O |
| 3 | O | O | O | X |
| 4 | O | O | O | O |
| 5 | O | X | X | O |
| 6 | O | X | O | X |
| 7 | O | X | X | X |
| 8 | O | X | O | O |
| 9 | X | O | O | X |
| 10 | X | O | O | O |
| 11 | X | X | O | O |
| 12 | X | X | O | X |

(51) Int. Cl.
*H04N 21/2387* (2011.01)
*G11B 27/02* (2006.01)
*H04N 21/435* (2011.01)
*H04N 21/8549* (2011.01)
*H04N 21/854* (2011.01)

(52) U.S. Cl.
CPC ....... *H04N 21/2387* (2013.01); *H04N 21/435* (2013.01); *H04N 21/854* (2013.01); *H04N 21/8549* (2013.01)

(58) Field of Classification Search
CPC ........... H04N 21/8455; H04N 21/4884; H04N 21/2353; H04N 21/2387; H04N 21/4122; H04N 21/8133; H04N 21/435; H04N 21/854; G06F 16/71; G06F 16/7844; G06F 16/7847; G11B 27/02; G11B 27/10; G11B 27/11; G11B 27/105
See application file for complete search history.

(56) References Cited

U.S. PATENT DOCUMENTS

| | | | |
|---|---|---|---|
| 2006/0117356 A1* | 6/2006 | Jojic | G06F 17/30811 725/88 |
| 2007/0027844 A1* | 2/2007 | Toub | G11B 27/105 |
| 2015/0106842 A1* | 4/2015 | Lee | H04N 21/8549 725/32 |

OTHER PUBLICATIONS

Office Action in KR 10-2017-0157237 (English translation).
Notice of Final Rejection of related application KR10-2017-0157237, dated May 9, 2019.

* cited by examiner

```
{"videos":[
        {"video_id":1670,
         "title":"Health Problem",
         "tags":null,
         "publisher":"ABC-Education",
         "orig_video_id":"VDc123DEf",
         "markup_timeline":true,
         "markup_text":false,
         "markup":true,
         "file_name":"Health Problem-en.vrt",
         "default_lang":"en",
         "cc_timeline":false,
         "cc_text":true,
         "category_id":2}
]}
```

```
------------------------------------
VRT
Language: ko
Author: Lee
Version: 0.1
Description: Sample 1
00:00:01.000 --> 00:00:02.000
Hello.

00:00:02.840 --> 00:00:03.000
Nice to meet you.
------------------------------------
```

FIG. 6

```
--------------------------------------------------------------------------
00:00:01.000 --> 00:00:02.000 play:start, loop:2, sound:100
Hello.

00:00:02.840 --> 00:00:03.000 ignore:true
Nice to meet you.

00:00:02.840 --> 00:00:03.000 play:end
Good-bye.
--------------------------------------------------------------------------
```

FIG. 7

|   | Subtitle information | | Summary information | |
| --- | --- | --- | --- | --- |
|   | First index | First subtitle | Second index | Second subtitle |
| 1 | O | O | X | X |
| 2 | O | O | X | O |
| 3 | O | O | O | X |
| 4 | O | O | O | O |
| 5 | O | X | X | O |
| 6 | O | X | O | X |
| 7 | O | X | X | X |
| 8 | O | X | O | O |
| 9 | X | O | O | X |
| 10 | X | O | O | O |
| 11 | X | X | O | O |
| 12 | X | X | O | X |

FIG. 8

VIDEO SUMMARY INFORMATION PLAYBACK DEVICE AND METHOD AND VIDEO SUMMARY INFORMATION PROVIDING SERVER AND METHOD

CROSS-REFERENCE TO RELATED APPLICATION

This application claims the benefit of Korean Patent Application No. 10-2017-0157237, filed on Nov. 23, 2017, in the Korean Intellectual Property Office, the disclosure of which is incorporated herein in its entirety by reference.

BACKGROUND

The present invention relates to a video summary information playback method and device, and more particularly, to a video summary information playback device and method and a video summary information providing server and method, by which a still frame of a video and at least one among default subtitle information of the video and video summary information generated based on a result of analyzing the video are output.

With high-performance processors and large-capacity memory, user terminals are able to shoot and play videos, receive digital broadcasts, and support additional services through various applications.

When a video with subtitles is played on a user terminal, the subtitles are usually output in synchronization with the video.

The user terminal sequentially plays the video and the subtitles from the beginning. When a user wants to quickly grasp the overall content of the video, the user plays the video at a certain fast-play speed through a user interface provided by a video playback program. However, when the video is played at the fast-play speed, the user terminal plays the video and the subtitles at the fast-play speed and it is hard for the user to clearly read the video and the subtitles to correctly grasp the overall content of the video. In addition, since every scene including scenes not essential to grasp the overall content is played, the demands of the user who wants to quickly grasp the overall content of the video are not efficiently met.

SUMMARY

The present invention provides a video summary information playback device and method and a video summary information providing server and method, in which a still frame of a video and at least one among default subtitle information of the video and video summary information generated based on a result of analyzing the video are output.

The present invention also provides a computer readable recording medium having recorded thereon a program for executing any one of the methods.

According to an aspect of an exemplary embodiment, there is provided a video summary information playback method including receiving a video selection signal based on an external input, receiving a video and subtitle information from a video server, receiving meta information of the video from a video summary information providing server, selectively receiving summary information based on the meta information, and outputting a still frame of the video and at least one among the subtitle information and the summary information based on the meta information.

The summary information may include second video index information and a second subtitle for a second indexed segment corresponding to the second video index information. The summary information may be generated by an external input based on a result of analyzing the video and may be stored in the video summary information providing server.

The summary information may further include a plurality of commands to be applied to at least one among the second indexed segment and the second subtitle.

The plurality of commands may include at least one among a playback command for performing automatic playback from a predetermined index start point to a predetermined index end point, a replay option, a playback sound option, a playback speed option, a playback skip option, a second subtitle output option, and an indexed segment edit output option.

The subtitle information may include first video index information and a first subtitle for a first indexed segment corresponding to the first video index information.

The meta information may include at least one among a video identifier, a video title, a video provider, a summary information file name, default language, a video category, use or non-use of the first video index information, use or non-use of the first subtitle, use or non-use of the summary information, use or non-use of the second video index information, and use or non-use of the second subtitle.

The outputting of the still frame of the video and the at least one among the subtitle information and the summary information may include outputting at least one subtitle among the first subtitle and the second subtitle in at least one segment among the first indexed segment and the second indexed segment according to a video index order, based on the use or non-use of the first video index information, the use or non-use of the first subtitle, the use or non-use of the summary information, the use or non-use of the second video index information, and the use or non-use of the second subtitle.

The video summary information playback method may further include receiving a previous input during playback of a current video index and outputting a still frame corresponding to a previous index before the current video index according to the video index order based on the previous input.

The video summary information playback method may further include receiving a next input during playback of a current video index and outputting a still frame corresponding to a next index after the current video index according to the video index order based on the next input.

According to an aspect of another exemplary embodiment, there is provided a video summary information providing method including storing meta information and summary information of a video, receiving a meta information request including a video identifier from a video summary information playback device, transmitting meta information of a video corresponding to the video identifier to the video summary information playback device, selectively receiving a summary information request with respect to the video from the video summary information playback device based on the meta information, and transmitting the summary information of the video to the video summary information playback device.

The video summary information providing method may further include generating the summary information based on a result of analyzing the video in response to an external input. The summary information may include second video index information and a second subtitle for a second indexed segment corresponding to the second video index information.

According to an aspect of another exemplary embodiment, there is provided a computer readable recording medium having recorded thereon a program for executing any one of the methods described above.

According to an aspect of another exemplary embodiment, there is provided a video summary information playback device including an input unit configured to receive a video selection signal based on an external input, a video receiver configured to receive a video and subtitle information from a video server, a summary information receiver configured to receive meta information of the video from a video summary information providing server and to selectively receive summary information based on the meta information, and an output unit configured to output a still frame of the video and at least one among the subtitle information and the summary information based on the meta information.

According to an aspect of another exemplary embodiment, there is provided a video summary information providing server including a storage unit configured to store meta information and summary information of a video, a meta information request receiver configured to receive a meta information request including a video identifier from a video summary information playback device, a meta information transmitter configured to transmit meta information of a video corresponding to the video identifier to the video summary information playback device, a summary information request receiver configured to selectively receive a summary information request with respect to the video from the video summary information playback device based on the meta information, and a summary information transmitter configured to transmit the summary information of the video to the video summary information playback device.

BRIEF DESCRIPTION OF THE DRAWINGS

Embodiments of the present invention will be more clearly understood from the following detailed description taken in conjunction with the accompanying drawings in which:

FIG. 6 is a diagram of summary information of a video, according to some embodiments of the present invention;

FIG. 7 is a diagram of summary information of a video, according to other embodiments of the present invention;

FIG. 8 is a diagram of cases of video summary information playback based on meta information, according to some embodiments of the present invention;

DETAILED DESCRIPTION OF THE EMBODIMENTS

Hereinafter, embodiments of the present invention will be described in detail with reference to the accompanying drawings in which like numbers refer to like elements and the sizes of elements may be exaggerated for clarity.

Figure 1:
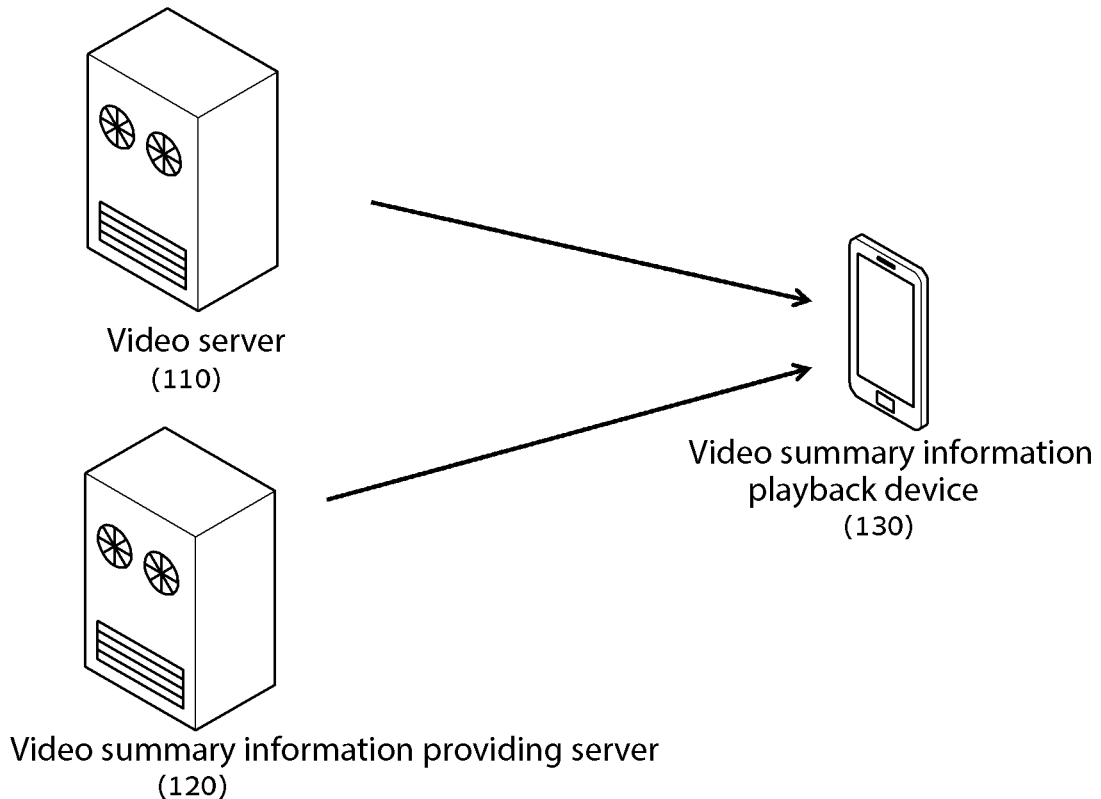
FIG. 1 is a diagram of a system for playing video summary information.

FIG. 1 is a diagram of a system for playing video summary information.

The system includes a video server 110, a video summary information providing server 120, and a video summary information playback device 130.

The video server 110 transmits a video and subtitle information to the video summary information playback device 130. The subtitle information includes video index information (hereinafter, referred to as first video index information) and a subtitle (hereinafter, a first subtitle) to be displayed in synchronization with an indexed segment corresponding to the first video index information. The first video index information indicates an elapsed point from the start point of a video and may be represented by playback time or the number of bytes, but it is apparent to those skilled in the art that the first video index information may be represented by other means. The subtitle information may also include duration information regarding duration while the first subtitle is being output.

For example, a typical video playback device analyzes subtitle information and outputs the first subtitle "Goodbye" to a display screen at a certain playback time "10.081" for duration "1.794", wherein the playback time "10.081" is presented as video index information.

The video summary information providing server 120 generates summary information based on a result of analyzing a video in response to an external input and stores the summary information together with meta information of the video. The summary information includes video index information (hereinafter, referred to as second video index information) and a subtitle (hereinafter, a second subtitle) to be displayed in synchronization with an indexed segment corresponding to the second video index information. The second video index information indicates points of essential scenes to grasp the entire video. The summary information will be described in detail with reference to FIGS. 6 and 7 below.

Meta information includes at least one among a video identifier, a video title, a video provider, a summary information file name, default language, a video category, use or non-use of the first video index information, use or non-use of the first subtitle, use or non-use of the summary information, use or non-use of the second video index information, and use or non-use of the second subtitle. The meta information will be described in detail with reference to FIG. 5 below.

The video summary information providing server 120 transmits the meta information and the summary information to the video summary information playback device 130 at the request of the video summary information playback device 130.

The video summary information playback device 130 plays the summary information of the video by outputting a still frame of a video index and at least one among the first subtitle and the second subtitle at each of essential indexed segments of the video based on the meta information. In this way, a user is allowed to efficiently and sufficiently grasp the overall content of the video without a full playback of the entire video.

Figure 2:
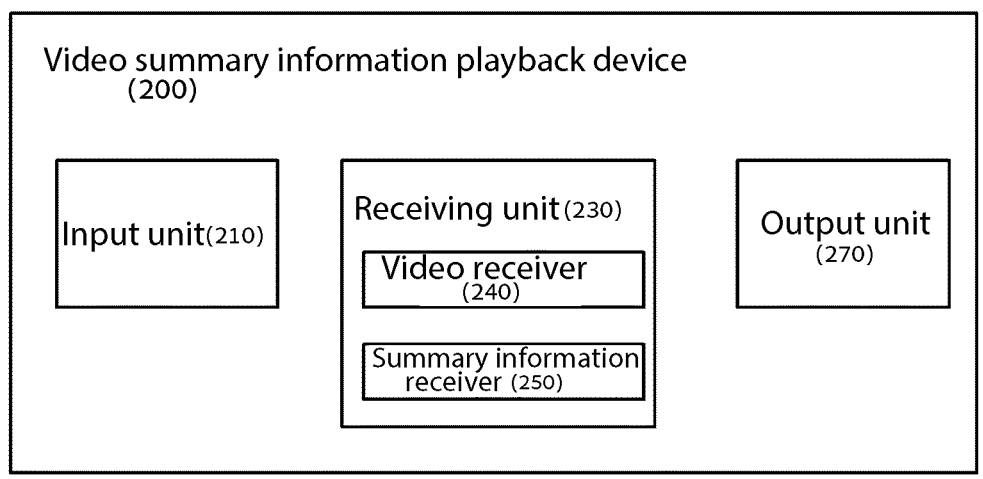
FIG. 2 is a block diagram of a video summary information playback device according to some embodiments of the present invention.

FIG. 2 is a block diagram of a video summary information playback device according to some embodiments of the present invention.

According to some embodiments of the present invention, a video summary information playback device 200 includes an input unit 210, a receiving unit 230, and an output unit 270. The receiving unit 230 includes a video receiver 240 and a summary information receiver 250.

The input unit 210 receives a video selection signal based on an external input.

The video receiver 240 receives a video and subtitle information from the video server 110. The subtitle information includes first video index information and a first subtitle for a first indexed segment corresponding to the first video index information. The subtitle information may be provided together with or separately from the video.

The summary information receiver 250 receives meta information of the video from the video summary information providing server 120 and selectively receives summary information based on the meta information.

The summary information includes second video index information and a second subtitle for a second indexed segment corresponding to the second video index information. The summary information is generated by an external input based on a result of analyzing the video and is stored in the video summary information providing server 120.

The meta information includes at least one among a video identifier, a video title, a video provider, a summary information file name, default language, a video category, use or non-use of the first video index information, use or non-use of the first subtitle, use or non-use of the summary information, use or non-use of the second video index information, and use or non-use of the second subtitle. The meta information will be described in detail with reference to FIGS. 5, 8, and 9 below.

According to other embodiments of the present invention, the summary information also includes a plurality of commands to be applied to at least one among the second indexed segment and the second subtitle. The plurality of commands include at least one among a playback command for performing automatic playback from a predetermined index start point to a predetermined index end point, a replay option, a playback sound option, a playback speed option, a playback skip option, a second subtitle output option, and an indexed segment edit output option. The plurality of commands will be described in detail with reference to FIG. 7 below.

The output unit 270 outputs a still frame of the video and at least one among the subtitle information and the summary information based on the meta information. The output unit 270 outputs at least one subtitle among the first subtitle and the second subtitle in at least one segment among the first and second indexed segments according to a video index order based on use or non-use of the first video index information, use or non-use of the first subtitle, use or non-use of the summary information, use or non-use of the second video index information, and use or non-use of the second subtitle. The operation of the output unit 270 based on the meta information will be described in detail with reference to FIGS. 8 and 9 below.

The input unit 210 receives a "previous" input during playback of a current video index. The output unit 270 outputs a still frame corresponding to a previous index before the current video index according to the video index order based on the "previous" input.

The input unit 210 also receives a "next" input during playback of a current video index. The output unit 270 outputs a still frame corresponding to a next index after the current video index according to the video index order based on the "next" input.

Figure 3:
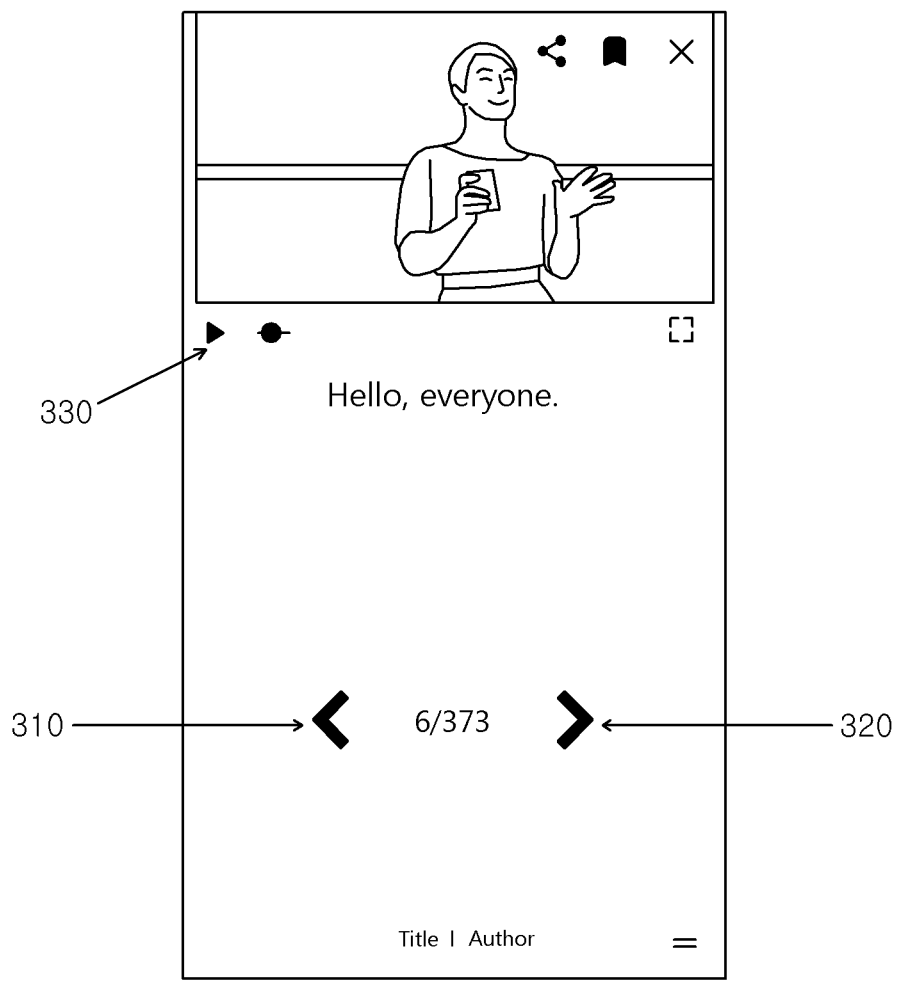
FIG. 3 is a diagram of an output screen of a video summary information playback device, according to some embodiments of the present invention.

FIG. 3 is a diagram of an output screen of the video summary information playback device 200, according to some embodiments of the present invention.

The video summary information playback device 200 receives a video and subtitle information, which are selected by a user's input, from the video server 110. The video summary information playback device 200 also selectively receives summary information based on the video's meta information received from the video summary information providing server 120.

In the embodiments illustrated in FIG. 3, the video summary information playback device 200 outputs a still frame of an indexed segment, which corresponds to one among first video index information and second video index information, and at least one among a first subtitle and a second subtitle based on the meta information.

When the user selects a "play" input 330 with respect to the still frame, the video summary information playback device 200 plays the video starting from the indexed segment corresponding to the still frame.

When the user selects a "previous" input 310 with respect to the still frame, the video summary information playback device 200 outputs a still frame corresponding to a previous indexed segment before the current indexed segment corresponding to the current still frame. The previous indexed segment is an indexed segment corresponding to one among the first video index information and the second video index information based on the meta information and is selected according to the video index order.

When the user selects a "next" input 320 with respect to the still frame, the video summary information playback device 200 outputs a still frame corresponding to a next indexed segment after the current indexed segment corresponding to the current still frame. The next indexed segment is an indexed segment corresponding to one among the first video index information and the second video index information based on the meta information and is selected according to the video index order.

The video summary information playback device 200 also provides various user interfaces for video bookmark, video sharing, screen size control, screen swipe, video index scrolling, video meta information check, etc. in addition to the play input 330, the previous input 310, and the next input 320.

Figures 4, 5:
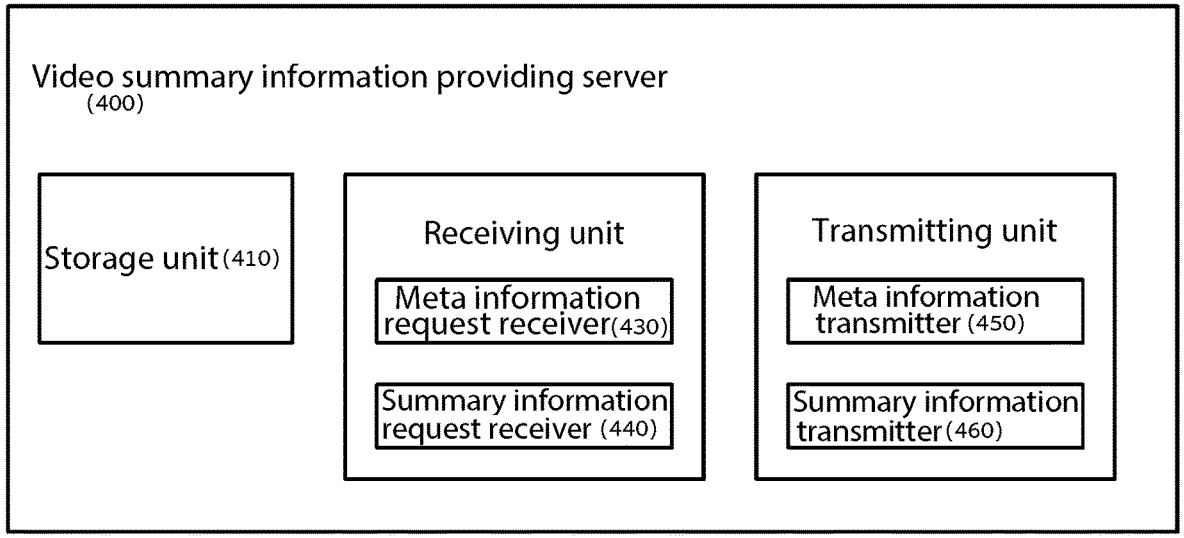
FIG. 4 is a block diagram of a video summary information providing server according to some embodiments of the present invention.
FIG. 5 is a diagram of meta information of a video, according to some embodiments of the present invention.

FIG. 4 is a block diagram of a video summary information providing server according to some embodiments of the present invention.

A video summary information providing server 400 includes a storage unit 410, a receiving unit, and a transmitting unit. The receiving unit includes a meta information request receiver 430 and a summary information request receiver 440. The transmitting unit includes a meta information transmitter 450 and a summary information transmitter 460.

The storage unit 410 stores meta information and summary information of a video. The summary information is generated by an external input based on a result of analyzing the video and is stored in the storage unit 410.

The meta information request receiver 430 receives a meta information request including a video identifier from the video summary information playback device 130.

The meta information transmitter 450 transmits the meta information of a video corresponding to the video identifier to the video summary information playback device 130.

The summary information request receiver 440 selectively receives a summary information request with respect to the video from the video summary information playback device 130 based on the meta information.

The summary information transmitter 460 transmits the summary information of the video to the video summary information playback device 130.

FIG. 5 is a diagram of meta information of a video, according to some embodiments of the present invention.

The meta information of a video is stored in the video summary information providing server 400, but it is apparent to those skilled in the art that the meta information may be stored in a separate database which can be accessed by the video summary information providing server 400 through a network.

The video summary information providing server 400 transmits the meta information of a video to the video summary information playback device 130 in response to a request from the video summary information playback device 130.

The meta information includes at least one among a video identifier, a video title, a video provider, a summary information file name, default language, a video category, use or non-use of first video index information, use or non-use of a first subtitle, use or non-use of the summary information, use or non-use of second video index information, and use or non-use of a second subtitle.

A video identifier is an identification (ID) which identifies a video in the video summary information providing server 400. Default language is default language for subtitles. A video category is an ID which identifies the category of a video. Use or non-use of summary information is in Boolean value, i.e., true or false, and indicates whether to use the summary information of the video. A summary information file name is the name of a file corresponding to the summary information. Use or non-use of first video index information is in Boolean value and indicates whether to use index information of subtitle information. Use or non-use of a first title is in Boolean value and indicates whether to use a subtitle of the subtitle information. Use or non-use of second video index information is in Boolean value and indicates whether to use index information of the summary information. Use or non-use of a second title is in Boolean value and indicates whether to use a subtitle of the summary information.

In the embodiments illustrated in FIG. 5, the title of a video is "Health Problem" and the summary information of the video is a file named "Health Problem-en.vrt". When the video summary information playback device 130 plays the summary information, the video summary information playback device 130 uses the second video index information, i.e., the index information of the summary information, but does not use the second subtitle, i.e., the subtitle of the summary information. When there is the first subtitle of the subtitle information with respect to a second indexed segment corresponding to the second video index information, the video summary information playback device 130 outputs a still frame of the second indexed segment together with the first subtitle.

FIG. 6 is a diagram of summary information of a video, according to some embodiments of the present invention.

The summary information includes second video index information and a second subtitle for a second indexed segment corresponding to the second video index information.

In the embodiments illustrated in FIG. 6, the second video index information is expressed as playback time in a format of "hours:minutes:seconds" in which different time units are separated by colons (:). The "seconds" section has a format of seconds and milliseconds. The second subtitle may be displayed in at least one line. At least one line break is used to separate the second subtitle from the second video index information, but it is apparent to those skilled in the art that other means may be used to separate the second subtitle from the second video index information.

In the embodiments illustrated in FIG. 6, "Hello" is displayed as the second subtitle from playback time "00:00:01.000" to playback time "00:00:02.000".

A file including the summary information of the video may also include attribute information of the summary information. As shown in FIG. 6, language, author, version and file description of subtitles may be included in the file. The summary information may also include a numeral indicating the place of the current second subtitle in a sequence of total subtitles.

FIG. 7 is a diagram of summary information of a video, according to other embodiments of the present invention.

According to the current embodiments, the summary information further includes a plurality of commands to be applied to at least one among the second video index information and the second subtitle. The plurality of commands include at least one among a playback command for performing automatic playback from a predetermined index start point to a predetermined index end point, a replay option, a playback sound option, a playback speed option, a playback skip option, a second subtitle output option, and an indexed segment edit output option.

In the embodiments illustrated in FIG. 7, "play:start" and "play:end" form a playback command for performing automatic playback from a video index start point indicated by "play:start" to a video index end point indicated by "play:end". A "loop" is a command for setting a replay option for the video. The "loop" may be set to a Boolean value, i.e., true or false, or an integer number, which respectively indicate turning on the replay option, turning off the replay option, and the number of iterations. When the number of iteration is not designated, one is set as the number of iterations by default. A "sound" is a command for setting a playback volume for the video. An "ignore" is in Boolean value to command to skip playback of the video during video index shift occurring due to a user's choice of "previous" or "next". It is apparent to those skilled in the art that the way of naming the plurality of commands (e.g., "play:start") may be changed.

Although not shown, the plurality of commands include a command for setting a video playback speed. In addition, the plurality of commands include a second subtitle output option including a thickness, a font, and color. The plurality of commands also include an indexed segment edit output option to provide edit output functions of adjusting the resolution of a screen, for example, enlarging or reducing a specific portion of the screen corresponding to a particular indexed segment; of simultaneously outputting particular images or particular indexed segments of one video or different videos at a predetermined position of a screen with a predetermined resolution and aspect ratio; of adding sound effects; and of modifying sound. According to the current embodiments, a video summary information playback device provides various editing effects usually provided by video editing programs, without changing the original version of a video, by using the second subtitle including a plurality of commands.

FIG. 8 is a diagram of cases of video summary information playback based on meta information, according to some embodiments of the present invention.

FIG. 8 shows the cases of video summary information playback based on use or non-use of first video index information of meta information, use or non-use of a first subtitle of the meta information, use or non-use of second video index information of meta information, and use or non-use of a second subtitle of the meta information.

The video summary information playback device 130 outputs at least one among the first subtitle and the second subtitle for an indexed segment corresponding to at least one among a first video index and a second video index according to the video index order, based on one case described in the meta information among the plurality of cases.

In the embodiments illustrated in FIG. 8, number 1 denotes a case where the meta information does not use the summary information but uses the first video index information and the first subtitle of the subtitle information. In this case, the video summary information playback device 130 outputs a still frame corresponding to a first indexed segment and the first subtitle synchronized with the first video index information according to a video index order indicated by the first video index information. The video summary information playback device 130 may set unit playback duration for the still frame. When there is no first subtitle synchronized with the first video index information, the video summary information playback device 130 does not output the first subtitle.

In the embodiments illustrated in FIG. 8, number 10 denotes a case where the meta information uses the second video index information and the second subtitle of the summary information and the first subtitle of the subtitle information but does not use the first video index information of the subtitle information. In this case, the video summary information playback device 130 outputs a still frame corresponding to a second indexed segment and the first subtitle and the second subtitle, which are synchronized with the second video index information, according to a video index order indicated by the second video index information. When there is no first subtitle synchronized with the second video index information, the video summary information playback device 130 does not output the first subtitle. When there is no second subtitle synchronized with the second video index information, the video summary information playback device 130 does not output the second subtitle.

Figure 9:
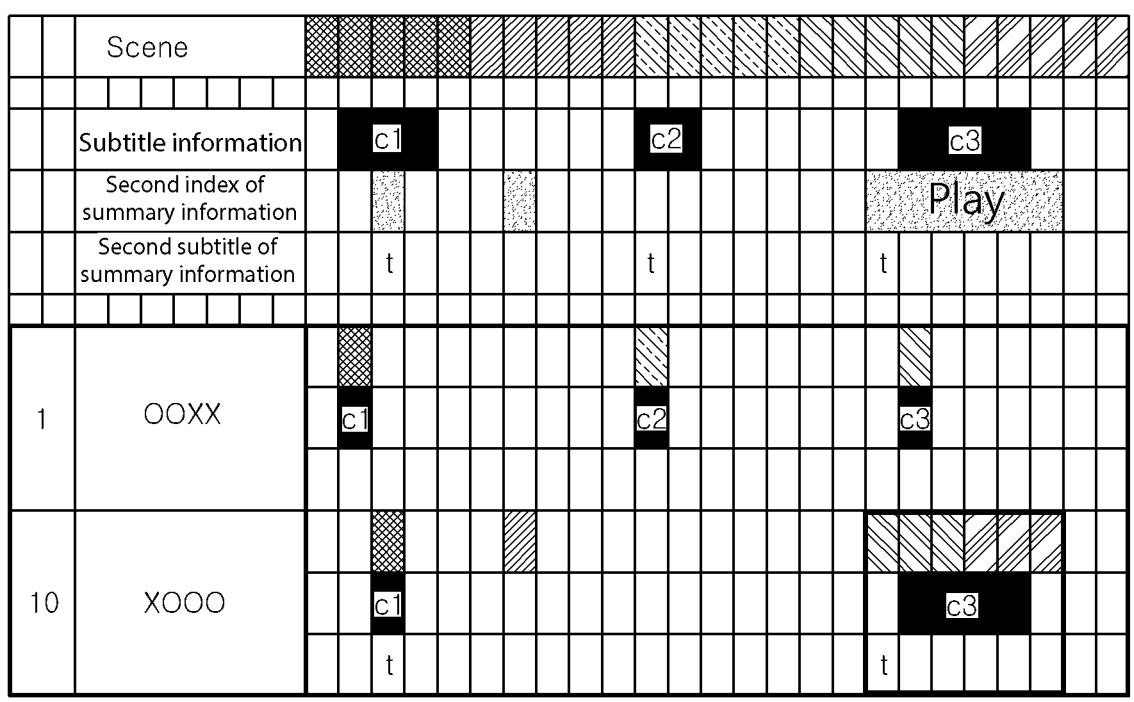
FIG. 9 is a diagram of video summary information playback based on meta information, according to some embodiments of the present invention.

FIG. 9 is a diagram of video summary information playback based on meta information, according to some embodiments of the present invention.

In the case of number 1 shown in FIG. 8, the meta information includes "false" for use or non-use of summary information, "false" for use or non-use of second video index information, "false" for use or non-use of a second subtitle, "true" for use or non-use of first video index information, and "true" for use or non-use of a first subtitle. The video summary information playback device 130 outputs a still frame corresponding to a first indexed segment and the first subtitle synchronized with the first video index information according to a video index order indicated by the first video index information. In the embodiments illustrated in FIG. 9, the video summary information playback device 130 outputs a still frame, which corresponds to a first index corresponding to the first video index information of the subtitle information, and the first subtitle "c1" synchronized with the first index.

In the case of number 10 shown in FIG. 8, the meta information includes "true" for use or non-use of summary information, "false" for use or non-use of first video index information, "true" for use or non-use of a first subtitle, "true" for use or non-use of second video index information, and "true" for use or non-use of a second subtitle. The video summary information playback device 130 outputs a still frame corresponding to a second indexed segment and the first subtitle and the second subtitle, which are synchronized with the second video index information, according to a video index order indicated by the second video index information. In the embodiments illustrated in FIG. 9, the video summary information playback device 130 outputs a still frame, which corresponds to a second index corresponding to the second video index information of the summary information, and the first subtitle "c1" and the second subtitle "t" synchronized with the second index.

Figure 10:
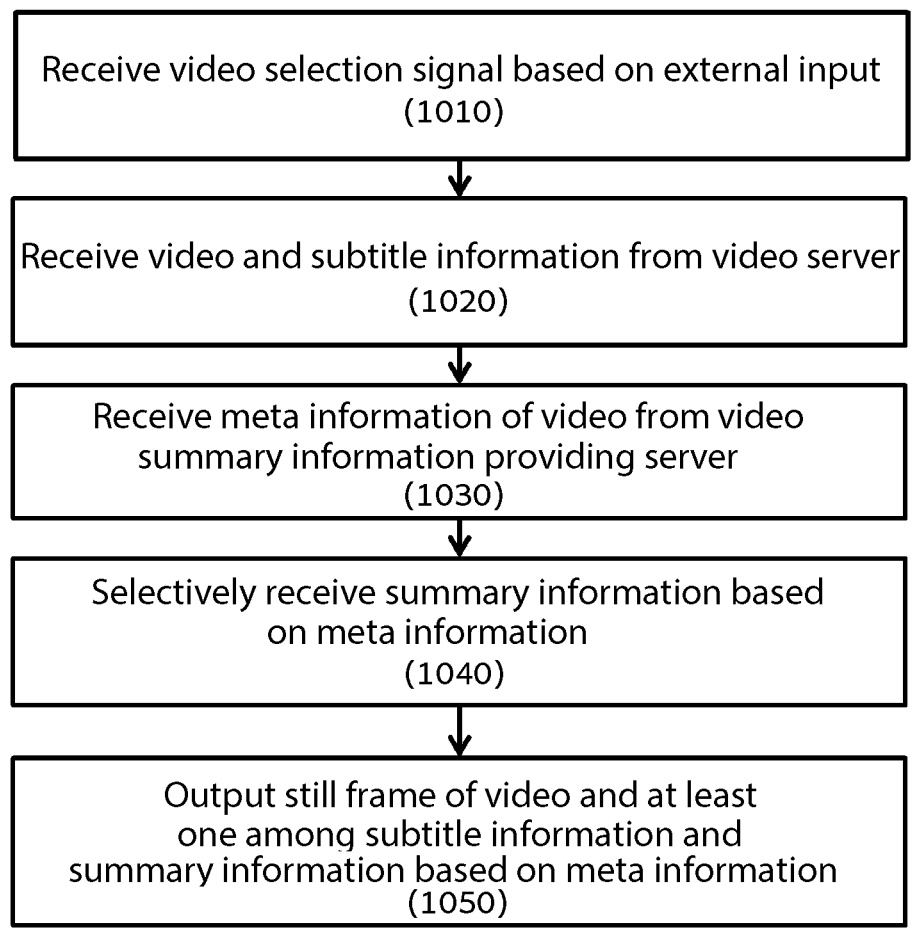
FIG. 10 is a flowchart of a video summary information playback method according to some embodiments of the present invention.

FIG. 10 is a flowchart of a video summary information playback method according to some embodiments of the present invention.

The video summary information playback device 130 receives a video selection signal based on an external input in operation 1010.

The video summary information playback device 130 receives a video and subtitle information from the video server 110 in operation 1020. The subtitle information includes first video index information and a first subtitle for a first indexed segment corresponding to the first video index information.

The video summary information playback device 130 receives meta information of the video from the video summary information providing server 120 in operation 1030. The meta information includes at least one among a video identifier, a video title, a video provider, a summary information file name, default language, a video category, use or non-use of the first video index information, use or non-use of the first subtitle, use or non-use of summary information, use or non-use of second video index information, and use or non-use of a second subtitle.

The video summary information playback device 130 selectively receives summary information based on the meta information in operation 1040. The summary information includes second video index information and a second subtitle for a second indexed segment corresponding to the second video index information. The summary information also includes a plurality of commands to be applied to at least one among the second indexed segment and the second subtitle. The plurality of commands include at least one among a playback command for performing automatic playback from a predetermined index start point to a predetermined index end point, a replay option, a playback sound option, a playback speed option, a playback skip option, a second subtitle output option, and an indexed segment edit output option.

The video summary information playback device 130 outputs a still frame of the video and at least one among the subtitle information and the summary information based on the meta information in operation 1050. In detail, the video summary information playback device 130 outputs at least one subtitle among the first subtitle and the second subtitle in at least one segment among the first and second indexed segments according to a video index order based on use or non-use of the first video index information, use or non-use of the first subtitle, use or non-use of the summary information, use or non-use of the second video index information, and use or non-use of the second subtitle.

The video summary information playback device 130 also receives a "previous" input during playback of a current video index. The video summary information playback device 130 outputs a still frame corresponding to a previous index before the current video index according to the video index order based on the "previous" input.

The video summary information playback device 130 also receives a "next" input during playback of a current video index. The output unit 270 outputs a still frame corresponding to a next index after the current video index according to the video index order based on the "next" input.

Figure 11:
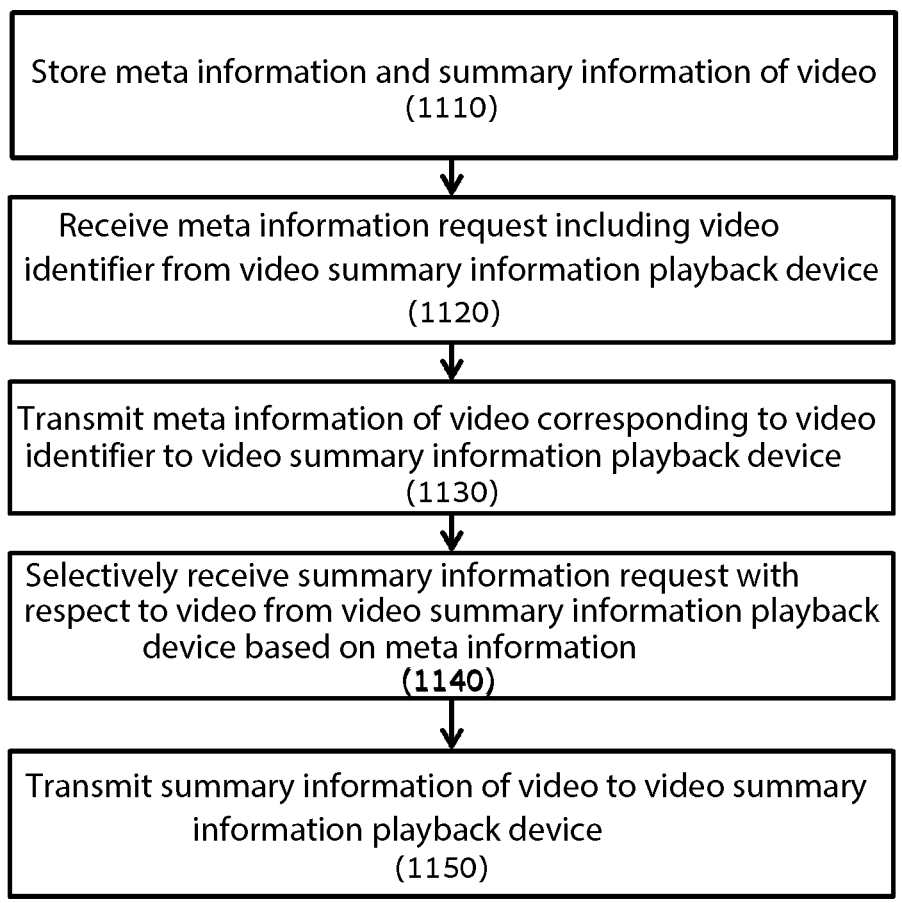
FIG. 11 is a flowchart of a video summary information providing method according to some embodiments of the present invention.

FIG. 11 is a flowchart of a video summary information providing method according to some embodiments of the present invention.

The video summary information providing server 120 stores meta information and summary information of a video in operation 1110. The video summary information providing server 120 generates and stores the summary information based on a result of analyzing the video in response to an external input.

The video summary information providing server 120 receives a meta information request including a video identifier from the video summary information playback device 130 in operation 1120.

The video summary information providing server 120 transmits the meta information of a video corresponding to the video identifier to the video summary information playback device 130 in operation 1130.

The video summary information providing server 120 selectively receives a summary information request with respect to the video from the video summary information playback device 130 based on the meta information in operation 1140.

The video summary information providing server 120 transmits the summary information of the video to the video summary information playback device 130 in operation 1150.

According to some embodiments of the present invention, a still frame of a video and at least one subtitle among default subtitle information of the video and video summary information generated based on a result of analyzing the video are output in each of essential indexed segments of the video, so that a user is allowed to efficiently and sufficiently grasp the overall content of the video without a full playback of the entire video. In other words, a video playback time taken for a user to grasp the content of the entire video can be reduced.

In addition, a video summary information providing server provides summary information including a plurality of commands to be applied to at least one among an indexed segment and the summary information of the video, so that a video summary information playback device can process various output control commands such as a playback command for performing automatic playback from a predetermined index start point to a predetermined index end point, a replay option, a playback sound option, a playback speed option, a playback skip option, a subtitle output option for the summary information, and an indexed segment edit output option when playing the summary information of the video.

While the present invention has been particularly shown and described with reference to embodiments thereof, it will be understood that various changes in form and details may be made therein without departing from the spirit and scope of the following claims.

For example, a device according to some embodiments of the present invention may also include a bus connected to each element of the device shown in the drawings, at least one processor connected to the bus, and memory connected to the bus to store commands, received messages, or generated messages. The memory is also connected to the at least one processor which executes the commands.

The present invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs). The computer readable recording medium can also be distributed over network coupled computer systems so that the computer readable code is stored and executed in a distributed fashion.

What is claimed is:

1. A video summary information playback device comprising:
    an input unit configured to receive a video selection signal based on an external input;
    a video receiver configured to receive a video and subtitle information from a video server;
    a summary information receiver configured to receive meta information of the video from a video summary information providing server and to selectively receive summary information from the video summary information providing server based on the meta information, wherein the summary information includes second video index information, a second subtitle for a second indexed segment corresponding to the second video index information and a plurality of commands to be applied to at least one among the second indexed segment and the second subtitle; and
    an output unit configured to output a still frame of the video and at least one among the subtitle information, received from the video server, and the summary information, received from the video summary information providing server, wherein the at least one of the subtitle information and the summary information is selected for output by a determination using the meta information;
    wherein the plurality of commands comprise a playback command for performing automatic playback from a predetermined index start point to a predetermined index end point, and an indexed segment edit output option to provide edit output functions of adjusting the resolution of a screen or of adding sound effects and the video summary information playback device processes the plurality of commands to output the adjusted screen or the added sound effects from the predetermined index start point to the predetermined index end point.

2. The video summary information playback device of claim 1, wherein
    the summary information is generated by an external input based on a result of analyzing the video and is stored in the video summary information providing server.

3. The video summary information playback device of claim 1, wherein the plurality of commands further comprise at least one among a replay option, a playback sound option, a playback speed option, a playback skip option, and a second subtitle output option.

4. The video summary information playback device of claim 2, wherein the subtitle information comprises first video index information and a first subtitle for a first indexed segment corresponding to the first video index information.

5. The video summary information playback device of claim 4, wherein the meta information comprises at least one among a video identifier, a video title, a video provider, a summary information file name, default language, a video category, use or non-use of the first video index information, use or non-use of the first subtitle, use or non-use of the summary information, use or non-use of the second video index information, and use or non-use of the second subtitle.

6. The video summary information playback device of claim 5, wherein the output unit outputs at least one subtitle among the first subtitle and the second subtitle in at least one segment among the first indexed segment and the second indexed segment according to a video index order, based on the use or non-use of the first video index information, the use or non-use of the first subtitle, the use or non-use of the summary information, the use or non-use of the second video index information, and the use or non-use of the second subtitle.

7. The video summary information playback device of claim 6, wherein the input unit receives a previous input during playback of a current video index, and the output unit outputs the still frame corresponding to a previous index before the current video index according to the video index order based on the previous input.

8. The video summary information playback device of claim 6, wherein the input unit receives a next input during playback of a current video index, and the output unit outputs the still frame corresponding to a next index after the current video index according to the video index order based on the next input.

9. A video summary information providing server comprising:
- a storage unit configured to store meta information and summary information of a video, wherein the summary information includes second video index information, a second subtitle for a second indexed segment corresponding to the second video index information and a plurality of commands to be applied to at least one among the second indexed segment and the second subtitle;
- a meta information request receiver configured to receive a meta information request comprising a video identifier from a video summary information playback device;
- a meta information transmitter configured to transmit, to the video summary information playback device, meta information of a video corresponding to the video identifier;
- a summary information request receiver configured to selectively receive a summary information request with respect to the video from the video summary information playback device based on the meta information; and
- a summary information transmitter configured to transmit the summary information of the video to the video summary information playback device;
- wherein the video summary information playback device outputs a still frame of the video and at least one of subtitle information and the summary information, wherein the at least one of the subtitle information and the summary information is selected for output by a determination using the meta information; and
- wherein the plurality of commands comprise a playback command for performing automatic playback from a predetermined index start point to a predetermined index end point, and an indexed segment edit output option to provide edit output functions of adjusting the resolution of a screen or of adding sound effects and the video summary information playback device processes the plurality of commands to output the adjusted screen or the added sound effects from the predetermined index start point to the predetermined index end point.

10. The video summary information providing server of claim 9, wherein
the summary information is generated by an external input based on a result of analyzing the video and is stored in the storage unit.

11. The video summary information providing server of claim 9, wherein the plurality of commands further comprise a replay option, a playback sound option, a playback speed option, a playback skip option, and a second subtitle output option.

12. The video summary information providing server of claim 10, wherein the meta information comprises at least one among a video identifier, a video title, a video provider, a summary information file name, default language, a video category, use or non-use of first video index information, use or non-use of a first subtitle, use or non-use of the summary information, use or non-use of the second video index information, and use or non-use of the second subtitle; and
the first video index information and the first subtitle are comprised in subtitle information provided together with the video.

13. A video summary information playback method comprising:
- receiving a video selection signal based on an external input;
- receiving a video and subtitle information from a video server;
- receiving meta information of the video from a video summary information providing server;
- selectively receiving summary information from the video summary information providing server based on the meta information, wherein the summary information includes second video index information, a second subtitle for a second indexed segment corresponding to the second video index information and a plurality of commands to be applied to at least one among the second indexed segment and the second subtitle; and
- outputting, from an output unit, a still frame of the video and at least one among the subtitle information, received from the video server, and the summary information, received from the video summary information providing server, wherein the at least one of the subtitle information and the summary information is selected for output by a determination using the meta information;
- wherein the plurality of commands comprise a playback command for performing automatic playback from a predetermined index start point to a predetermined index end point, and an indexed segment edit output option to provide edit output functions of adjusting the resolution of a screen or of adding sound effects and the video summary information playback device processes the plurality of commands to output the adjusted screen or the added sound effects from the predetermined index start point to the predetermined index end point.

14. The video summary information playback method of claim 13, wherein
the summary information is generated by an external input based on a result of analyzing the video and is stored in the video summary information providing server.

15. The video summary information playback method of claim 13, wherein the plurality of commands further comprise at least one among a replay option, a playback sound option, a playback speed option, a playback skip option, and a second subtitle output option.

16. The video summary information playback method of claim 14, wherein the subtitle information comprises first video index information and a first subtitle for a first indexed segment corresponding to the first video index information.

17. The video summary information playback method of claim 16, wherein the meta information comprises at least one among a video identifier, a video title, a video provider, a summary information file name, default language, a video category, use or non-use of the first video index information, use or non-use of the first subtitle, use or non-use of the summary information, use or non-use of the second video index information, and use or non-use of the second subtitle.

18. The video summary information playback method of claim 17, wherein the outputting of the still frame of the video and the at least one among the subtitle information and the summary information comprises outputting at least one subtitle among the first subtitle and the second subtitle in at least one segment among the first indexed segment and the second indexed segment according to a video index order, based on the use or non-use of the first video index information, the use or non-use of the first subtitle, the use or non-use of the summary information, the use or non-use of the second video index information, and the use or non-use of the second subtitle.

19. The video summary information playback method of claim 18, further comprising:
receiving a previous input during playback of a current video index; and
outputting the still frame corresponding to a previous index before the current video index according to the video index order based on the previous input.

20. The video summary information playback method of claim 18, further comprising:
receiving a next input during playback of a current video index; and
outputting the still frame corresponding to a next index after the current video index according to the video index order based on the next input.

21. A video summary information providing method comprising:
storing meta information and summary information of a video, wherein the summary information includes second video index information, a second subtitle for a second indexed segment corresponding to the second video index information and a plurality of commands to be applied to at least one among the second indexed segment and the second subtitle;
receiving a meta information request comprising a video identifier from a video summary information playback device;
transmitting, from a meta information transmitter to the video summary information playback device, meta information of a video corresponding to the video identifier;
selectively receiving a summary information request with respect to the video from the video summary information playback device based on the meta information; and
transmitting the summary information of the video to the video summary information playback device;
wherein the video summary information playback device outputs a still frame of the video and at least one of subtitle information and the summary information, wherein the at least one of the subtitle information and the summary information is selected for output by a determination using the meta information;
wherein the plurality of commands comprise a playback command for performing automatic playback from a predetermined index start point to a predetermined index end point, and an indexed segment edit output option to provide edit output functions of adjusting the resolution of a screen or of adding sound effects and the video summary information playback device processes the plurality of commands to output the adjusted screen or the added sound effects from the predetermined index start point to the predetermined index end point.

22. The video summary information providing method of claim 21, further comprising:
generating the summary information based on a result of analyzing the video in response to an external input.

23. The video summary information providing method of claim 21, wherein the plurality of commands comprise a replay option, a playback sound option, a playback speed option, a playback skip option, and a second subtitle output option.

24. The video summary information providing method of claim 22, wherein the meta information comprises at least one among a video identifier, a video title, a video provider, a summary information file name, default language, a video category, use or non-use of first video index information, use or non-use of a first subtitle, use or non-use of the summary information, use or non-use of the second video index information, and use or non-use of the second subtitle; and
the first video index information and the first subtitle are comprised in subtitle information provided together with the video.

* * * * *